(12) United States Patent
Eastman et al.

(10) Patent No.: US 6,226,597 B1
(45) Date of Patent: May 1, 2001

(54) METHOD OF MAINTAINING COMPONENTS SUBJECT TO FATIGUE FAILURE

(75) Inventors: Donald G. Eastman; Richard L. Elgin; Beilene Hao, all of San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 09/101,823

(22) PCT Filed: Nov. 26, 1997

(86) PCT No.: PCT/US97/21628

§ 371 Date: Jul. 16, 1998

§ 102(e) Date: Jul. 16, 1998

(87) PCT Pub. No.: WO98/24042

PCT Pub. Date: Jun. 4, 1998

Related U.S. Application Data

(60) Provisional application No. 60/031,507, filed on Nov. 27, 1996.

(51) Int. Cl.[7] .................................................. G01B 3/44
(52) U.S. Cl. .................................. 702/34; 702/84; 703/7
(58) Field of Search ................................ 702/34, 83, 84; 703/7, 6, 13, 18

(56) References Cited

U.S. PATENT DOCUMENTS

| | | | |
|---|---|---|---|
| 4,920,807 | * 5/1990 | Stokes et al. | 73/808 |
| 5,210,704 | * 5/1993 | Husseiny | 364/551.01 |
| 5,331,579 | * 7/1994 | Maguire, Jr. et al. | 364/578 |
| 5,455,777 | * 10/1995 | Fujiyama et al. | 364/507 |
| 5,625,664 | * 4/1997 | Berkley | 378/72 |
| 5,629,871 | * 5/1997 | Love et al. | 364/551.01 |
| 5,648,919 | * 7/1997 | Yamauchi et al. | 364/578 |
| 5,666,297 | * 9/1997 | Brit et al. | 364/578 |
| 5,852,793 | * 12/1998 | Board et al. | 702/56 |

* cited by examiner

*Primary Examiner*—Patrick Assouad
(74) *Attorney, Agent, or Firm*—Wood, Phillips, VanSanten, Clark & Mortimer

(57) ABSTRACT

A method is provided for maintaining components subject to fatigue failure during in service use. The method uses statistical distributions (10) in a simulation of in service use (16) of a fleet of components to predict the failure rate (12) of the fleet over a fixed time increment (14, 26) for an assumed inspection program. These predictions are used to determine an operating plan (20), including an inspection program, that will maintain an acceptable failure rate by detecting components with fatigue indications and removing the components prior to failure (22). The inspection program provides actual fatigue data resulting from in service use (18). As the inspection data base grows, the simulation is revised (24, 48) to incorporate the data. The predicted failure rates and the operating plan (20) are then updated based on the revised simulation.

5 Claims, 3 Drawing Sheets

METHOD OF MAINTAINING COMPONENTS SUBJECT TO FATIGUE FAILURE

This application is a continuation of provisional application Ser. No. 60/031,507 filed Nov. 27, 1996, the entire disclosure of which is incorporated herein by reference.

FIELD OF THE INVENTION

This invention relates to maintenance of components that are subject to fatigue failure.

BACKGROUND OF THE INVENTION

It is well known that component fatigue life is a major factor in the design of many mechanical, fluid, and electrical devices and systems. In systems that require high reliability, component fatigue life becomes even more critical. Aircraft gas turbine engines are an example of systems that require high reliability and for which component fatigue life is a critical factor. Component fatigue life is especially critical for the high energy rotor components of gas turbine engines because they pose a significant threat to aircraft safety should an uncontained failure occur. Given the potentially disastrous consequences of hardware failures in any aircraft gas turbine engine, the aircraft engine industry has developed very sophisticated design methodologies which attempt to insure that all critical engine components can reliably meet service life expectations for a given set of operating conditions. Thus, fatigue failure due to repeated duty cycles is a failure mode of great interest to the engine designers because it directly influences the reliability and life cycle cost of the end product. Accordingly, there is heavy emphasis placed upon designing components which safely maximize their fatigue life.

The primary approach to designing fatigue susceptible hardware which has evolved over many years within the aircraft engine community is commonly referred to as the "safe life" method. The safe life method is based on the principle that the minimum number of load cycles that can be sustained before the generation of a fatigue crack or other fatigue indication may be deterministically calculated for any given design. This minimum number of load cycles must take into account variations in hardware dimensions, material properties and operating environments (ambient conditions). In the safe life method, once this minimum number of operating cycles is determined, a retirement limit or life for the hardware is established. Retirement limits are typically set less than the minimum number of load cycles to provide a margin of safety. At least one engine manufacturer has typically used a safety factor of three to determine its retirement limits. It would be understood by those skilled in the art that the safe life method may be applied to any mechanical, electrical or fluid component.

One typical procedure for determining the safe life of a new component for a gas turbine engine involves the following:

Determine the expected duty cycle.
Establish minimum engine and deteriorated engine thermodynamic conditions.
Perform a transient heat transfer analysis using the thermodynamic conditions.
Perform a transient finite element stress analysis using the heat transfer results.
Establish the maximum operational strain ranges in the component for several locations, accounting for a "mission mix" of ambient conditions and engine deterioration.
Determine the minimum fatigue life based on the strain ranges and existing specimen fatigue data.
Apply a safety factor to the minimum life based on service experience, test experience, etc. to determine the retirement limit of the component.

While theoretically ensuring a high degree of reliability, there are some disadvantages to the safe life method. For example, since the method is deterministic in nature and assumes minimum values throughout, the vast majority of components are forced to retire long before they have developed cracks or other failure indications. For the aircraft engine industry, this is not cost effective in that many engines are forced off wing and torn down to have hardware with remaining useful life removed and discarded.

In addition, experience has shown that despite the application of the safe life approach, fatigue failures in service can occur. For aircraft engines, this discrepancy is usually the result of one of several factors, including:

Inaccurate heat transfer or stress analysis.
Improper duty cycle definition or operators who employ duty cycles other than that assumed.
Hardware failures in the control system which allow engine operation at other than the assumed thermodynamic conditions.
Control logic "bugs" which allow engine operation at other than the assumed thermodynamic conditions.

Also, since the declared safe life for a given component is calculated assuming no need for inspection, that component is generally not inspected prior to reaching its retirement limit. This is often the case even if the hardware is available for some other maintenance reason. If the original analysis on which the safe life limit is based should turn out to be non-conservative, valuable opportunities to detect negative fatigue trends in a fleet of engines are lost and oftentimes the first indication of a problem is an actual failure. Alternatively, if the analysis upon which the limit is defined proves to be overly conservative, a complicated and time consuming program of forced removals and inspections is required in order to gather data to support incremental life extensions.

SUMMARY OF THE INVENTION

It is the principal object of the invention to provide a new and improved method of maintaining components subject to fatigue failure during use in the field. More specifically, it is an object to provide a method of maintaining fatigue critical components in a system that maintains or increases the level of reliability or safety of the system while reducing the operating cost of the system for the system users.

Another object is to provide an enhanced approach to establishing life limits of fatigue critical components. It is another object of the invention, to provide a method of maintaining fatigue critical components that allows for the detection of unexpected or non-nominal failure modes. It is a further object to provide a method that allows for easy life extensions of fatigue critical components for a real time health monitoring capability. Yet another object is to provide a tool for numerically evaluating the effect of various maintenance scenarios during the life cycle of a component or product, such as a turbine engine. A further object of the invention is to reduce the number of forced component removals.

One or more of the above objects are achieved in a method that uses statistical distributions in a simulation of in service use of a fleet of components to predict the failure rate of the fleet over a fixed time increment for an assumed inspection program. These predictions are used to determine an operating plan, including an inspection program, that will maintain an acceptable failure rate by detecting components with fatigue indications and removing the components prior to failure. The inspection program provides actual fatigue data resulting from in service use. As the inspection data base grows, the simulation is revised to incorporate the data. The predicted failure rates and the operating plan are then updated based on the revised simulation.

More specifically, one or more of the above objects are achieved in a method for maintaining components subject to fatigue failure during in service use. The method includes the steps of:

a) determining a probabilistic distribution of a fatigue indication occurrence and a probabilistic distribution of a fatigue failure life for a given component that is subject to fatigue failure from actual in service use;

b) setting an acceptable in service failure rate for the given component;

c) forecasting each given component that will be in service during a first time increment;

d) simulating in service use and inspection of the given components over the first time increment to determine an acceptable operating plan for the given components based on
  1) the probabilistic distributions of the fatigue indication occurrence and fatigue failure life,
  2) a probability of detecting a detectible fatigue indication during inspection of any one of the given components,
  3) the forecasted components that will be in service during the first time increment, and
  4) the acceptable in service failure rate;

e) placing a plurality of the given component in service;

f) inspecting the given components that are in service according to the operating plan to
  1) collect fatigue data produced by the in service usage of the given components, and
  2) if a fatigue indication is detected in one of the given components during inspection, removing the one given component from service to prevent an in service failure;

g) determining revised probabilistic distributions of the fatigue indication occurrence and the fatigue failure life for the given component based on the fatigue failure data collected during inspection;

h) forecasting each of the given components that will be in service during a subsequent time increment;

i) re-simulating in service usage and inspection of the given components over the subsequent time period to determine a revised acceptable operating plan for the given components based on
  1) the revised probabilistic distributions of the fatigue indication occurrence and fatigue failure life,
  2) a probability of detecting a detectible fatigue indication during inspection of any one of the given components,
  3) the forecasted components that will be in service during the subsequent time increment, and
  4) the acceptable in service failure rate; and j) inspecting the given components that are in service according to the revised operating plan to
  1) collect additional fatigue failure data produced by the in service usage of the given components, and
  2) if a fatigue indication is detected in one of the given components during inspection, removing the one given component from service to prevent an in service failure.

In one form the method further includes the step of repeating steps g) through j) until step i) indicates that revision of the operating plan is no longer required to achieve the acceptable in service failure rate.

DETAILED DESCRIPTION OF THE PREFERRED EMBODIMENT

Figure 1:
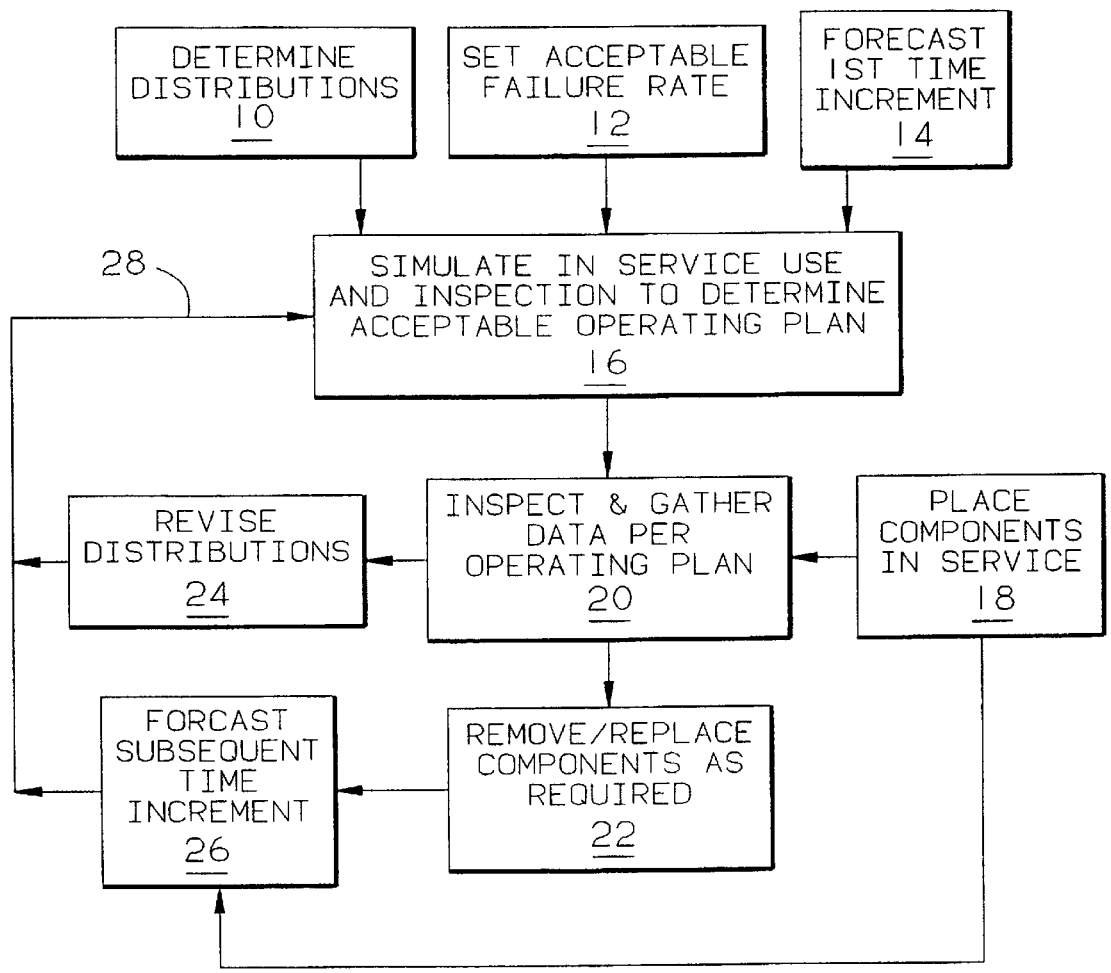
FIG. 1 is a flow chart illustrating a method embodying the invention.

The flow chart of the method of the invention is shown in FIG. 1. As illustrated by block 10, one of the initial steps of the method is to determine a probabilistic distribution of a fatigue indication occurrence and a probabilistic distribution of a fatigue failure life for a component that is subject to fatigue failure from actual in service use. Another initial step is to set an acceptable in service failure rate for the component, as shown by block 12. Additionally, a forecast must be made of each of the components that will be in service during a first time increment, as shown by block 14. This step includes forecasting how many of the components will be in service, and the fatigue history and characteristics of each specific component that will be in service. As shown in block 16, After these three initial steps 10, 12, and 14, a simulation of the in service use and inspection of the components over the first time increment is performed to determine an acceptable operating plan for the components. The simulation is based on the probabilistic distributions of the fatigue indication occurrence and fatigue failure life from block 10, a probability of detecting a detectible fatigue indication during inspection of any one of the components, the forecasted components that will be in service during the first time increment from block 14, and the acceptable in service failure rate from block 12. The operating plan will include an inspection program, and may include guidelines for in service use of the components and targeted removal, replacement, and repair of the components. As seen in blocks 18 and 20, a plurality of components are placed in service and inspected according to the operating plan. The inspection is used to collect fatigue data produced by the in service use of the components, and if a fatigue indication is detected in one of the components during inspection, the component is replaced or removed from service to prevent an in service failure, as shown by block 22. As shown in block 24, revised probabilistic distributions of the fatigue indication occurrence and the fatigue failure life for the component are determined based on the fatigue failure data collected during inspection. Additionally, as shown in block 26, a forecast is made of the components that will be in service during a subsequent time increment. This forecast includes information regarding new components that have been placed in service during the current time increment in block 18 and components that have been removed and/or replaced in block 22. Next, as shown by the arrow 28, in service usage and inspection of the components over the subsequent time period is re-simulated to determine a revised acceptable operating plan for the components based on the revised probabilistic distributions of the fatigue indication occurrence and fatigue failure life from block 24, a probability of detecting a detectible fatigue indication during inspection of any one of the components, the forecasted components that will be in service during the subsequent time increment from block 26, and the acceptable in service failure rate from block 12. The steps in blocks 16, 18, 20, 22, 24, and 26 are then repeated using the revised operating plan during each repetition, until step 16 indicates that the operating plan no longer needs to be revised to achieve an acceptable in service failure rate.

A more detailed explanation of the method will now be described by applying the method to a rotor for a gas turbine engine. However, it should be understood that the method may be applied to any component that is subject to fatigue failure, and that no limitation to application of the method to gas turbine engines or rotors for gas turbine engines is intended unless specifically recited in the claims.

When a new rotor design for a turbine engine is being introduced for the first time in service, the method initially follows the conventional safe life approach. Thus, a detailed duty cycle is defined, thermodynamic state points are determined and the necessary heat transfer and stress analyses are performed to establish the deterministic minimum predicted life (i.e. the minimum number of operating cycles to generate a fatigue crack or other failure indication). At this point, the method diverges from the safe life approach in that this minimum life is not treated as a retirement life, nor is it used to calculate one. Rather, experience has shown that there is a statistical distribution to fatigue failures and that this distribution can be described well using the Weibull cumulative probability function:

$$F(t) = 1 - e^{-(t/\eta)^\beta}$$

The t in the equation is the number of operating cycles of the component. $\eta$ is the characteristic life which is proportional to the mean-time-to-failure, while $\beta$ represents the shape parameter of the distribution and is the slope of the Weibull line. The slope identifies the class of the failure mode such as infant mortality ($\beta<1$), random failures ($1<\beta<2$) and wear out($\beta>2$).

Having determined a minimum life for a component, a Weibull distribution for the new part may be created by assuming the deterministic minimum predicted life represents a known occurrence probability. For new designs, a normal distribution of failure lives is assumed and deterministic minimum predicted life is assigned a probability of exceedence of 0.135% ($-3\sigma$). This point acts to anchor the assumed Weibull distribution and a slope for the line passing through the point is initially assumed based on past experience. With these assumptions, a theoretical fatigue indication occurrence distribution, such as the fatigue cracking occurrence distribution shown in FIG. 1, can be constructed for any component. A more detailed discussion of Weibull analysis is contained in "Weibull Analysis Handbook" by R. B. Abernethy, J. E. Breneman, C. H. Medlin, and G. L. Reinman; 1983, U.S. Air Force AFWAL-TR-83-2079, AD#A143100.

The next step in the method is to use the predicted Weibull distribution in a Monte Carlo simulation. The Monte Carlo technique incorporates the distributions and forecasts the number of rotors that will develop and propagate cracks and fail in service. The Monte Carlo simulation considers such things as the component age, cracking occurrence rate based on the predicted Weibull distribution, crack growth rates, inspection rate, probability of detection during inspection, and the introduction of new production wheels into service. An example of an overall simulation flow chart is shown in FIG. 2.

Figure 2:
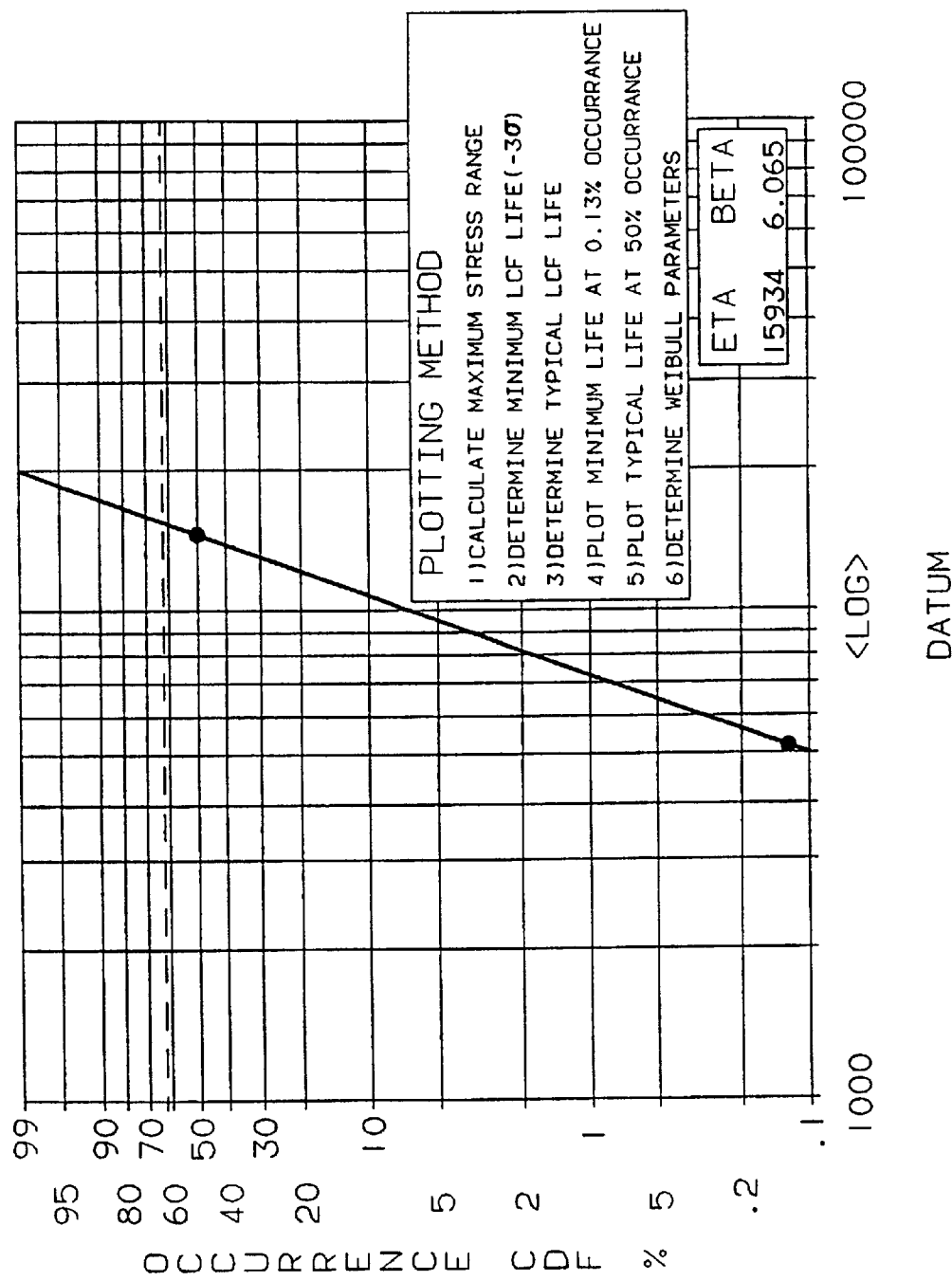
FIG. 2 is a graph showing an example of a Weibull cumulative probability function for theoretical fatigue cracking occurrence distribution for a component used in the invention.
Figure 3:
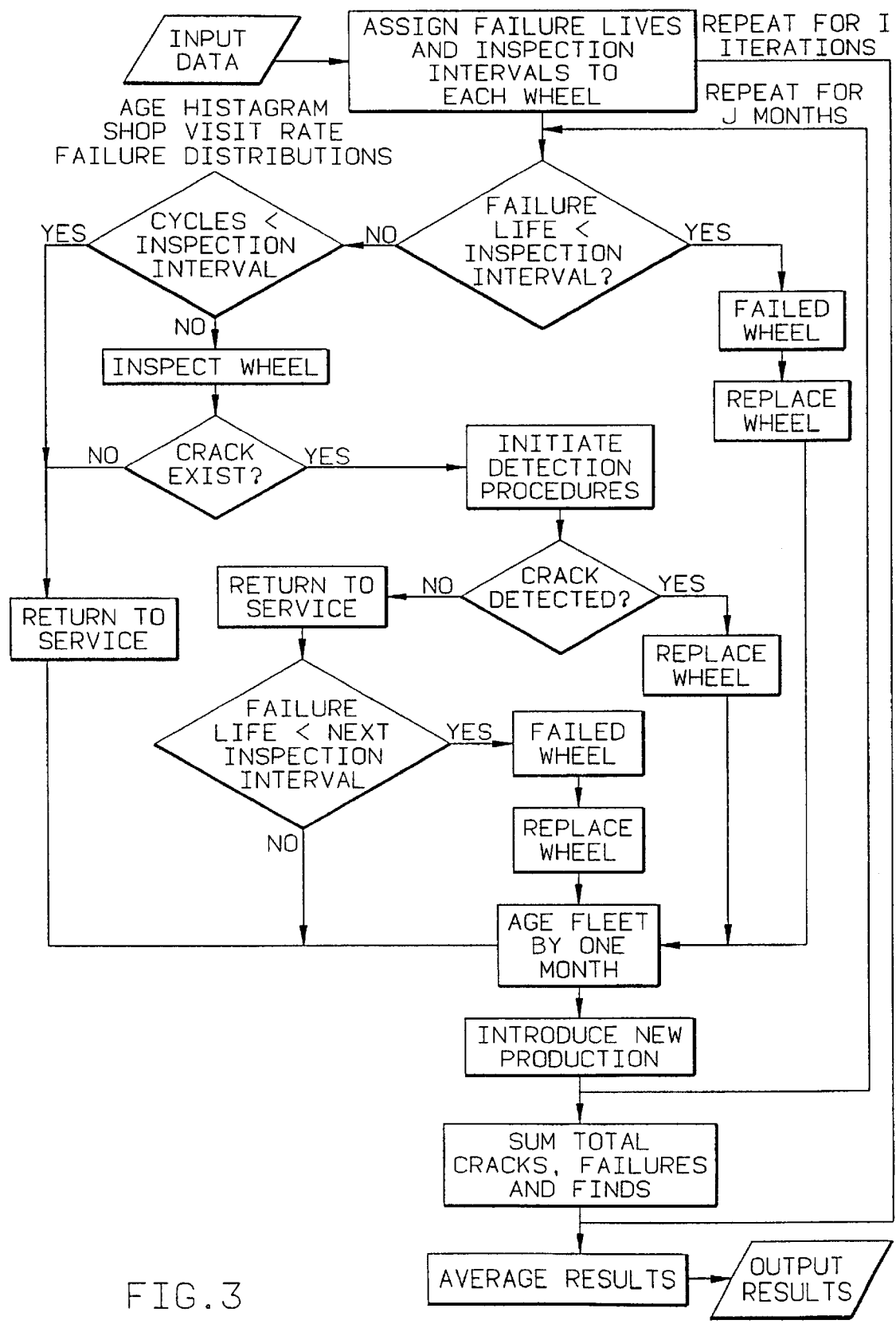
FIG. 3 is a flow chart illustrating a Monte Carlo simulation used in the invention.

As seen in FIG. 2, each component and its current corresponding age in cycles or hours is entered into the model in the form of a histogram. The algorithm uses a random number generator to assign a crack initiation life and inspection interval for each component based on the respectively generated distributions. To determine the actual life to failure, the simulation uses either a crack growth rate based on linear elastic fracture mechanics and an assumed 0.032" initial crack size, or a statistical failure distribution, such as a Weibull distribution.

Once the crack initiation, inspection, and failure lives are determined, the simulation then ages each component based on the average customer usage rate for a specified amount of time. As the component is aged, it is evaluated against the lives assigned by the Weibull distribution to determine its final condition. This final outcome is the result of iteratively placing each component through all possible events with respect to time. For example, when a component reaches the calculated inspection interval, the program simulates the inspection and determines whether a crack is discovered based on the probability of detection for the specific inspection type used. The probability of detection curve takes into account the size of the crack based on the crack growth rate using the well known Paris law and the system errors of the inspection. If a crack is found, the component is removed for study and replaced; otherwise it is returned to the field with a new assigned inspection life. If the component reaches its failure life before the next inspection, a failure is predicted to occur in service.

The simulation can also be configured to consider multiple failure modes, which often exist for a component. More specifically, in some cases, cracks that are initiated by one mode may be propagated by another mode. These different modes can be defined to be independent or correlated to each other using complex or simple combinatorial statistics (i.e., Hypergeometric, binomial distributions). This allows the complex failure nature of the hardware to be simulated using a single or series of failure distributions rather than trying to model the physical failure mechanisms of the individual failure modes. This is useful, for instance, where high cycle fatigue might truncate the low cycle fatigue life. Modeling of the high cycle fatigue mechanism is often times difficult, but data on failure rates after transition is often available or can be easily approximated by a finite interval of time which is very small compared to the low cycle fatigue life (i.e., a few hours of operation).

In addition to handling multiple failure modes, the Monte Carlo simulation may include various preventive or corrective actions which may be introduced in the simulation at different points in the simulated time to assess their impact. Examples of these actions include: changes to the design, simulated by altering the failure distribution for new production units being introduced into the fleet; a reduced or increased interval between inspections; a change to the operating procedures for the engine, simulated by altering the crack initiation or failure distributions based on analytical predictions of how the altered usage will affect the stresses in the life limiting parts; changes in inspection methods; and the introduction of component repairs, simulated by forcing the unit out of service and replacing it with a zero time unit and a new initiation or failure distribution.

Thus, by simulating each component over a specified time interval, the program determines how many components will be cracked, how many components will be inspected, how many of the cracked components will be found in inspection and how many will fail and by what mode. The simulation is repeated a large number of times (10,000–100, 000 times) and averaged. The averaged results are then used to guide an inspection program for the components. Typically, any in service failure of a rotor is considered unacceptable. Accordingly, if the averaged results simulation indicates that more than 0.5 in service failures during the time interval, the inspection program may be revised to prevent the failure. Typically, this can be accomplished by decreasing the inspection interval for the inspection program or by upgrading inspection procedures. Other options for preventing the failure include targeted removals of high time components, and/or changes in the in service usage of the components.

In order to verify the basic assumptions inherent in the analysis and to provide for the earliest possible detection of negative fatigue trends, it is desirable to begin collecting as much data as possible from inspections. In the case of a new engine, each rotor returning to an overhaul shop is inspected at every opportunity, such as during shop visits for routine maintenance. The inspection results are used to revise the Weibull distributions. As the assumed cracking distribution is replaced by actual field data, the need for frequent inspections is re-evaluated, and if supported by the analysis, the interval between inspections is lengthened. Eventually, the analytical process is fully based on actual inspection data and the need for periodic inspections can be optimized.

It is quite possible that the inspection program may reveal multiple failure modes in service, some of which might not have been accounted for in the original analysis. In this case, the distribution for the new mode can be included in the Monte Carlo simulation and revised forecasts quickly generated. Also, the effectiveness of potential design changes can be evaluated by allowing new "fixed" failure distributions to be introduced to individual components during a shop visit. This provides a powerful tool for evaluating the effectiveness of various retrofit scenarios. As an engine design reaches full maturity, the actual failure rate will be well defined based on the inspection program. At that time, it is possible to accurately define an inspection criteria and retirement limits which maintain the desired failure occurrence rate while maximizing the utilization of hardware. A successful case study of the method is detailed in co-pending provisional application Ser. No. 60/031,507, filed Nov. 27, 1996, which has been incorporated in its entirety herein by reference.

What is claimed is:

1. A method of maintaining components subject to fatigue failure during in service use, the method comprising the steps of:

a) determining a probabilistic distribution of a fatigue indication occurrence and a probabilistic distribution of a fatigue failure life for a given component that is subject to fatigue failure from actual in service use;

b) setting an acceptable in service failure rate for the given component;

c) forecasting each given components that will be in service during a first time increment;

d) simulating in service use and inspection of the given components over the first time increment to determine an acceptable operating plan for the given components based on 1) the probabilistic distributions of the fatigue indication occurrence and fatigue failure life, 2) a probability of detecting a detectible fatigue indication during inspection of any one of the given components, 3) the forecasted components that will be in service during the first time increment, and 4) the acceptable in service failure rate;

e) placing a plurality of the given component in service;

f) inspecting the given components that are in service according to the operating plan to 1) collect fatigue data produced by the in service usage of the given components, and 2) if a fatigue indication is detected in one of the given components during inspection, removing the one given component from service to prevent an in service failure;

g) determining revised probabilistic distributions of the fatigue indication occurrence and the fatigue failure life for the given component based on the fatigue failure data collected during inspection;

h) forecasting each of the given components that will be in service during a subsequent time increment;

i) re-simulating in service usage and inspection of the given components over the subsequent time period to determine a revised acceptable operating plan for the given components based on 1) the revised probabilistic distributions of the fatigue indication occurrence and fatigue failure life, 2) a probability of detecting a detectible fatigue indication during inspection of any one of the given components, 3) the forecasted components that will be in service during the subsequent time increment, and 4) the acceptable in service failure rate; and j) inspecting the given components that are in service according to the revised operating plan to 1) collect additional fatigue failure data produced by the in service usage of the given components, and 2) if a fatigue indication is detected in one of the given components during inspection, removing the one given component from service to prevent an in service failure.

2. The method of claim 1 further comprising the step of repeating steps g) through j) until step i) indicates that revision of the inspection program is no longer required to achieve the acceptable in service failure rate.

3. The method of claim 1 wherein the operating plan comprises an inspection program, guidelines for in service use of the given components, and at least one of targeted removal, replacement, and repair of the given components.

4. A method of maintaining components subject to fatigue failure during in service use, the method comprising the steps of:

a) determining a probabilistic distribution of a fatigue indication occurrence and a probabilistic distribution of a fatigue failure life for a given component that is subject to fatigue failure from actual in service use;

b) setting an acceptable in service failure rate for the given component;

c) forecasting each given component that will be in service during a first time increment;

d) simulating in service use and inspection of the given components over the first time increment to determine an acceptable inspection program for the components based on 1) the probabilistic distributions of the fatigue indication occurrence and fatigue failure life, 2) a probability of detecting a detectible fatigue indication during inspection of any one of the given components, 3) the forecasted components that will be in service during the first time increment, and
4) the acceptable in service failure rate;

e) placing a plurality of the given components in service;

f) inspecting the given components that are in service according to the inspection program to
 1) collect fatigue data produced by the in service usage of the given components, and
 2) if a fatigue indication is detected in one of the given components during inspection, removing the one given component from service to prevent an in service failure;

g) determining revised probabilistic distributions of the fatigue indication occurrence and the fatigue failure life for the given component based on the fatigue failure data collected during inspection;

h) forecasting each given component that will be in service during a subsequent time increment;

i) re-simulating in service usage and inspection of the given components over the subsequent time period to determine a revised acceptable inspection program for the given components based on
 1) the revised probabilistic distributions of the fatigue indication occurrence and fatigue failure life,
 2) a probability of detecting a detectible fatigue indication during inspection of any one of the given components,
 3) the forecasted components that will be in service during the subsequent time increment, and
 4) the acceptable in service failure rate; and j) inspecting the given components that are in service according to the revised inspection program to
 1) collect additional fatigue failure data produced by the in service usage of the given components, and
 2) if a fatigue indication is detected in one of the given components during inspection, removing the one given component from service to prevent an in service failure.

5. The method of claim 1 further comprising the step of repeating steps g) through j) until step i) indicates that revision of the inspection program is no longer required to achieve the acceptable in service failure rate.

* * * * *